(12) United States Patent
Bellessort et al.

(10) Patent No.: US 10,095,563 B2
(45) Date of Patent: Oct. 9, 2018

(54) METHOD, DEVICE, AND COMPUTER PROGRAM FOR IMPROVING ACCESS TO SERVICES IN A WEB RUNTIME ENVIRONMENT

(71) Applicant: CANON KABUSHIKI KAISHA, Tokyo (JP)

(72) Inventors: Romain Bellessort, Rennes (FR); Youenn Fablet, La Dominelais (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 14/918,388

(22) Filed: Oct. 20, 2015

(65) Prior Publication Data

US 2016/0117207 A1    Apr. 28, 2016

(30) Foreign Application Priority Data

Oct. 24, 2014  (GB) .................................... 1419001.1
Jul. 8, 2015    (GB) .................................... 1511933.2

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |

(52) U.S. Cl.
CPC .................................... *G06F 9/547* (2013.01)

(58) Field of Classification Search
None
See application file for complete search history.

(56) References Cited

U.S. PATENT DOCUMENTS

| | | | |
|---|---|---|---|
| 2004/0051901 A1* | 3/2004 | Fukuda | G06F 3/1268 358/1.16 |
| 2004/0221299 A1* | 11/2004 | Gibbs | H04L 67/104 719/331 |
| 2006/0168122 A1 | 7/2006 | Acharya et al. | |
| 2010/0077410 A1 | 3/2010 | Graser et al. | |
| 2012/0198104 A1 | 8/2012 | Miyachi et al. | |

FOREIGN PATENT DOCUMENTS

GB        2506369 A      4/2014

* cited by examiner

*Primary Examiner* — Chat Do
*Assistant Examiner* — William C Wood
(74) *Attorney, Agent, or Firm* — Canon U.S.A., Inc. IP Division

(57) ABSTRACT

The invention relates to processing a service request by a web runtime environment in a processing device, the processing of the service request enabling a service provider to provide a service requested in the service request. After having selected a specific interface based on the service request, a web driver application associated with the service requested in the service request is executed and the selected specific interface is implemented. Then, it is possible to interact with the web driver application, via said specific interface, for providing the service by the service provider.

20 Claims, 7 Drawing Sheets

METHOD, DEVICE, AND COMPUTER PROGRAM FOR IMPROVING ACCESS TO SERVICES IN A WEB RUNTIME ENVIRONMENT

This application claims the benefit under 35 U.S.C. § 119(a)-(d) of United Kingdom Patent Application No. 1419001.1, filed on Oct. 24, 2014 and of United Kingdom Patent Application No. 1511933.2, filed on Jul. 8, 2015, both entitled "METHOD, DEVICE, AND COMPUTER PROGRAM FOR IMPROVING ACCESS TO SERVICES IN A WEB RUNTIME ENVIRONMENT". The above cited patent applications are incorporated herein by reference in their entirety.

FIELD OF THE INVENTION

The invention generally relates to the field of processing service requests in a web runtime environment. More particularly, the invention concerns a method, a device, and a computer program for improving access to services, in particular access to remote services, in a web runtime environment. The invention enables a web runtime environment to rely on specific web applications referred here to as web driver applications in order to interact with services. The interaction between the web runtime environment and the web driver application is made possible by defining interfaces such as specific application programming interfaces (API). The interaction is also made possible with the help of script modules.

BACKGROUND OF THE INVENTION

A web application, also called a web app, is an application relying on web technologies. Typically, such an application is developed in the HyperText Markup Language (HTML), the Cascading Style Sheets (CSS) language, or the JavaScript language. A web application is generally designated through a Uniform Resource Locator (URL) which indicates a resource, for example an application. Therefore, what is sometimes referred to as a "web page" can also be seen as a web application. A web application can also be a packaged application that may be installed on a device. In such a case, the application is stored persistently on the device.

In the context of the invention, it is considered that a web application is typically executed by a Web Runtime Environment (WRE), for example Mozilla's Firefox OS or a web browser, enabling web applications loaded and run in the web runtime environment to cooperate.

FIG. 1, comprising FIGS. 1a and 1b, illustrates two examples of web runtime environments.

As illustrated in FIG. 1a, a web runtime environment can be a software component 100 relying on an operating system 105 to run web applications 110. A web runtime environment typically consists of one or several software modules, for example generic modules and specific modules, among which a web runtime controller, which may comprise sub-modules. Web browsers like Mozilla Firefox, Google Chrome and Microsoft Internet Explorer, are examples of such a web runtime environment (Google, Chrome, Microsoft, and Internet Explorer are trademarks).

Alternatively, as illustrated in FIG. 1b, a web runtime environment 100' can be integrated into an operating system 105' to run web applications 110'. In such a case, the whole operating system is based on web technologies. Examples of such a web runtime environment are Google Chrome OS and Mozilla Firefox OS.

A script module comprises a set of code instructions that can be executed by a web runtime environment. JavaScript™ is a common language for writing script modules.

The HTML enables web applications to embed script modules through the "script" tag. When a web runtime environment processes such a tag in the HTML code of a web application, it can determine some code that it should load and execute so that the corresponding web application can use it. The code may be directly included within the "script" tag. The code may also be indicated through a reference to a resource that can be determined from an attribute of the "script" tag, typically the "src" attribute.

Alternatively, a web runtime environment may also execute a script module even if not referred to by a web application. In particular, this is the case of web browser extensions. Such extensions complement web browsers with additional features. Such additional features may or may not be made available to web applications. In case they are made available, web applications can use such features (e.g. a specific Application Programming Interface "API") as if it were directly provided by the web runtime environment.

This is therefore a specific way for a web runtime environment to provide a certain features to web applications. Consequently, in the remainder of this document, when it is the case that a web runtime environment provides certain features to a web application, it is considered that one of the way for the web runtime environment to do so consists in relying on a script module. Another way of doing this consists in having the feature to be implemented in the source code of the web runtime environment.

In the following description, different components may interact through interfaces. In particular, a web application or a script module may interact with a web runtime environment through an interface. Similarly, a web runtime or a script module may interact with a network service through an interface.

An interface may provide a set of functions implemented by a given component and that can be called by another component. For instance, a web runtime environment may call some functions of such an interface implemented by a driver application. In some cases, the interface may also define events that can be triggered by the other component and caught by the given component. The catching of such an event enables the given component to determine a process to be performed. For instance, a web runtime environment may trigger a "start" event of a driver application so that the driver application starts the processing of a task.

An interface may also provide a communication channel through which messages can be exchanged between two components. In such a case, it is considered that the kind of messages that can be exchanged is a part of the interface. A specific kind of message enables the first component (resp. the second component) to request the second component (resp. the first component) to perform a corresponding processing. If both components do not agree on the meaning of messages, no communication is possible. In a specific implementation, messages may be obtained through an event system (as described with regard to the first type of interface). In this second case, the means associated with the communication channel do not depend on the type of the interface (such means are generic and can be used for any type of interface, contrary to the set of messages which are specific and makes the interface distinct from other interfaces).

A network service is a service made accessible through a network. Examples of such services are remote media display services which provide the service of displaying media on a remote screen or network printing services which provide the service of printing a document thanks to a printer connected to a network.

Such services generally implement specific application programming interfaces (API) enabling applications to interact with them. Implemented APIs depend on the type of service provided. For the sake of illustration, the Universal Plug and Play (UPnP) protocol defines a number of different types of services.

Prior to interacting with a network service, an application has to discover which services can be accessed. This can be done thanks to discovery protocols, such as multicast Domain Name System (mDNS) protocol. A discovery process basically consists in sending a request for services on a network and waiting for responses. Each response typically provides information about a corresponding service by providing, for example, a URL to a configuration file describing the considered service.

Alternatively, each of the services periodically advertises itself to all the devices connected to a considered network, without requiring any discovery request.

It is to be noted that network services are generally implemented by devices which are different from the ones which make use of them. Accordingly, these services are often called remote services. Nevertheless, an application running on a given device can access a service through a network interface even though that service is hosted in the same device.

There exist APIs, in particular JavaScript APIs, which provide web applications with interaction capabilities so that those web applications can address requests directed to services that are remote from the web runtime environment (or web browser) in which they are executed. For the sake of illustration, a web application can request the printing of specific data, for example using the known window.print( ) function, or can request the displaying on a remote display of the data pointed to by a URL, for example using the Presentation API which is an API currently standardized by the World Wide Web Consortium (W3C).

In such cases, the requesting web application does not request a specific service or type of service and does not know exactly how to interact with the remote service. Interactions between the web application and a specific service are handled by an API which provides high-level control to the web application, enabling the latter to interact with a service of a predetermined type.

Discovering available services of a predetermined type is carried out by the web runtime environment which interacts at a low-level with a selected remote service. Still for the sake of illustration, a web runtime environment can use a page description format, when processing printing requests, to obtain printable data from provided data, and a communication protocol such as Internet Printing Protocol (IPP) in order to interact with an IPP printer. According to another example, the web runtime environment can use a protocol such as Miracast for remote displaying of data (Miracast is a trademark).

However, since web runtime environments interact with an increasing number of devices and services, more and more technologies have to be integrated in web runtime environments so that they can interact with these devices and services.

As a consequence, there is a need for implementing such technologies efficiently.

SUMMARY OF THE INVENTION

Faced with these constraints, the inventors provide a method, a device and a computer program for improving access to services, in particular access to remote services, in a web runtime environment.

It is a broad object of the invention to remedy the shortcomings of the prior art as described above.

According to a first aspect of the invention there is provided a method for processing a service request by a web runtime environment in a processing device, the processing of the service request enabling a service provider to provide a service requested in the service request, the method comprising:

selecting a specific interface based on the service request, typically selecting a specific interface based on a service family associated with the service request;

executing a web driver application associated with the service requested in the service request and implementing the selected specific interface; and interacting with the web driver application, via said specific interface, for providing the service by the service provider, the selecting, executing, and interacting steps being carried out in the web runtime environment.

Therefore, the method of the invention makes it possible to use a generic model for which various interfaces, such as APIs, can be defined, reducing the need for web runtime environments to implement various proprietary and/or specific technologies.

Moreover, since services make themselves compatible with web applications by providing a driver application implementing a corresponding interface (for example an API), device manufacturers and/or service developers can use proprietary technologies between their driver applications and their services.

Defining a generic service discovery/interaction interface (for example an API) is not complex for a web runtime environment as it can be used for any kind of service. However, in such a case, the web applications have to know the interface to be used to interact with a selected service. This may not be desirable. Therefore, providing a script module that provides a generic interface is advantageous.

Also, embodiments do not necessarily require having a web runtime environment to implement APIs, but just the generic discovery/interaction one.

In an embodiment, the service request is a network service request, the service provider being hosted in a device remote from the processing device.

In an embodiment, the method further comprises receiving, in the web runtime environment, via a standard interface implemented within the web runtime environment, the service request from a service requester application.

In an embodiment, the method further comprises receiving at least one item of information from the service provider through the specific interface and the web driver application, wherein the interacting step comprises transmitting the received at least one item of information to the service requester application through the standard interface.

In an embodiment, the method further comprises:
receiving at least one item of information from the service provider through the specific interface and the web driver application; and
processing the received at least one item of information in the web runtime environment,
wherein the interacting step comprises transmitting the processed at least one item of information to the service requester application through the standard interface or transmitting a result of processing the received at least one item of information to the service requester application through the standard interface.

In an embodiment, the method further comprises transforming the service request in the web runtime environment, thereby obtaining a transformed service request, the transformed service request being adapted to be processed by the specific interface, wherein the interacting step comprises sending the transformed service request to the web driver application using the specific interface.

In an embodiment, the interacting step comprises transmitting data received from the service requester application or from a component of the web runtime environment to the service provider through the specific interface and the web driver application, the data being data to be processed by the service requested in the service request.

In an embodiment, the data received from the service requester application or from a component of the web runtime environment and transmitted to the service provider through the specific interface and the web driver application are received after having received the service request.

In an embodiment, the method further comprises processing the data in the web runtime environment, the step of transmitting data to the service provider through the specific interface and the web driver application comprising transmitting the processed data to the service provider through the specific interface and the web driver application.

In an embodiment, the method further comprises:
discovering the service provider and the web driver application associated with the service requested in the service request and implementing the selected specific interface; and
loading the driver web application for execution by the web runtime environment for communicating with the service provider, the steps of discovering and loading being carried out prior executing the web driver application.

In an embodiment, the step of discovering the service provider and the web driver application comprises receiving a service description, the service description comprising information relative to the location of the web driver application.

In an embodiment, the method further comprises determining that loading the driver web application for execution by the web runtime environment for communicating with the service provider is mandatory.

In an embodiment, the method further comprises:
determining that loading the driver web application for execution by the web runtime environment for communicating with the service provider is optional; and
obtaining items of information for determining whether or not the driver web application for execution by the web runtime environment for communicating with the service provider is to be loaded.

In an embodiment, the method further comprises determining whether or not the driver web application is loaded within the web runtime environment.

In an embodiment, the web driver application is configured for interacting with a plurality of service providers and/or a plurality of service requesters.

In an embodiment, the method further comprises displaying an interface associated with the web driver application.

In an embodiment, the method further comprises receiving a user input through the web driver application.

In an embodiment, the method further comprises displaying a second interface, different from the interface associated with the web driver application, after receiving the user input, the user input being obtained via the interface associated with the web driver application.

In an embodiment, the specific interface is a specific application interface.

In an embodiment, the specific application interface is an Application Programming Interface.

In an embodiment, the implementation of the specific interface provides a set of functions associated with a type of service.

In an embodiment, the specific interface is configured to define events that can be triggered by said web runtime environment thereby enabling the web driver application to determine a process to perform.

In an embodiment, the specific interface is a communication interface configured for the exchange of a set of messages associated with a type of service.

In an embodiment, the method further comprises a step of loading a script module upon instruction of a service requester application generating the service request, and the interacting with the web driver application is performed by the script module through the communication interface.

A second aspect of the invention provides a device for processing a service request by a web runtime environment implemented in the device, the processing of the service request enabling a service provider to provide a service requested in the service request, the device comprising at least one microprocessor configured for carrying out in the web runtime environment the steps of:
selecting a specific interface based on the service request;
executing a web driver application associated with the service requested in the service request and implementing the selected specific interface; and
interacting with the web driver application, via said specific interface, for providing the service by the service provider.

Therefore, the device of the invention makes it possible to use a generic model for which various interfaces (such as APIs) can be defined, reducing the need for web runtime environments to implement various proprietary and/or specific technologies.

Moreover, since services make themselves compatible with web applications by providing a driver application implementing a corresponding interfaces (for example an API), device manufacturers and/or service developers can use proprietary technologies between their driver applications and their services.

In an embodiment, the at least one microprocessor is further configured for carrying out a step of receiving, in the web runtime environment, via a standard interface implemented within the web runtime environment, the service request from a service requester application.

In an embodiment, the at least one microprocessor is further configured for carrying out a step of receiving at least one item of information from the service provider through the specific interface and the web driver application, wherein the interacting step comprises transmitting the received at least one item of information to the service requester application through the standard interface.

In an embodiment, the at least one microprocessor is further configured for carrying out the steps of:
  receiving at least one item of information from the service provider through the specific interface and the web driver application; and
  processing the received at least one item of information in the web runtime environment,
    wherein the interacting step comprises transmitting the processed at least one item of information to the service requester application through the standard interface or transmitting a result of processing the received at least one item of information to the service requester application through the standard interface.

In an embodiment, the at least one microprocessor is further configured so that the interacting step comprises transmitting data received from the service requester application or from a component of the web runtime environment to the service provider through the specific interface and the web driver application, the data being data to be processed by the service requested in the service request.

In an embodiment, the at least one microprocessor is further configured for carrying out a step of processing the data in the web runtime environment, the step of transmitting data to the service provider through the specific interface and the web driver application comprising transmitting the processed data to the service provider through the specific interface and the web driver application.

In an embodiment, the at least one microprocessor is further configured for carrying out a step of:
  discovering the service provider and the web driver application associated with the service requested in the service request and implementing the selected specific interface; and
  loading the driver web application for execution by the web runtime environment for communicating with the service provider,
the steps of discovering and loading being carried out prior executing the web driver application.

In an embodiment, the at least one microprocessor is further configured so that the step of discovering the service provider and the web driver application comprises receiving a service description, the service description comprising information relative to the location of the web driver application.

In an embodiment, the at least one microprocessor is further configured for carrying out a step of determining that loading the driver web application for execution by the web runtime environment for communicating with the service provider is mandatory.

In an embodiment, the at least one microprocessor is further configured for carrying out a step of:
  determining that loading the driver web application for execution by the web runtime environment for communicating with the service provider is optional; and
  obtaining items of information for determining whether or not the driver web application for execution by the web runtime environment for communicating with the service provider is to be loaded.

In an embodiment, the at least one microprocessor is further configured for carrying out a step of determining whether or not the driver web application is loaded within the web runtime environment.

In an embodiment, the at least one microprocessor is further configured for carrying out a step of displaying an interface associated with the web driver application.

In an embodiment, the at least one microprocessor is further configured for carrying out a step of receiving a user input through the web driver application.

In an embodiment, the at least one microprocessor is further configured for carrying out a step of displaying a second interface, different from the interface associated with the web driver application, after receiving the user input, the user input being obtained via the interface associated with the web driver application.

In an embodiment, the specific interface is a specific application interface. In an embodiment, the specific application interface is an Application Programming Interface.

In an embodiment, the implementation of the specific interface provides a set of functions associated with a type of service.

In an embodiment, the specific interface is configured to define events that can be triggered by said web runtime environment thereby enabling the web driver application to determine a process to perform.

In an embodiment, the specific interface is a communication interface configured for the exchange of a set of messages associated with a type of service.

In an embodiment, the at least one microprocessor is further configured to load a script module upon instruction of a service requester application generating the service request, and the interacting with the web driver application is performed by the script module through the communication interface.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 1, comprising

DETAILED DESCRIPTION OF EMBODIMENTS OF THE INVENTION

Figure 1A:
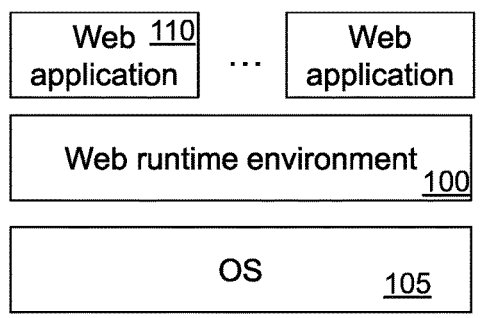
FIGS. 1a and 1b, illustrates two examples of web runtime environments.
Figure 1B:
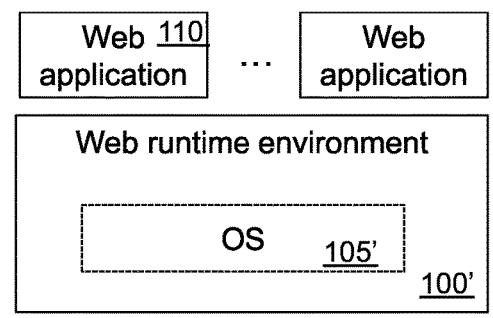

A particular embodiment of the invention aims at defining a specific type of web application hereinafter referred to as a web driver application. When discovered, a service provides a link to an associated web driver application, for example a URL identifying the web driver application. After a web runtime environment has discovered a service, it loads the associated web driver application.

A specific interface, for example an application programming interface (API), can be defined so that a web runtime environment and a web driver application can interact. Such an interface is advantageously adapted to the features of a considered service and to the needs of web runtime environments in view of these features.

It is to be noted that generally speaking, such an interface which allows interaction with the services works at a lower level than the interface used by the requesting web applications to interact with the web runtime environment, that does not directly control the services.

Accordingly, web driver applications make it possible to avoid implementing in the web runtime environments all the items of technology which are required for enabling interactions with remote services. The web runtime environments simply define and implement dedicated interfaces for different types of services. These interfaces allow the web runtime environments to interact with the web driver applications which in turn interact with remote services using their preferred protocols. As a consequence, fewer items of technology are needed in the web runtime environments and more flexibility is offered to service developers as they can rely on proprietary means to implement the interactions between their web driver applications and their services.

A driver web application does not necessarily have to be displayed to the user, especially if it does not require any user input. Therefore, such an application may have no user interface. For instance, it may not comprise any HTML file, nor any CSS file, but only a JavaScript file, or a set of JavaScript files. In some cases, other configuration files may also be used, for instance a manifest file indicating which resources belong to the driver application.

For the sake of clarity, a concept of service family is defined here. A service family mainly consists of a set of service types which provide similar features, such as printing or remote displaying. In other words, all the service types (or technologies) which may be used to interact with a printing service are considered to form a service family. Similarly, all the service types (or technologies) that may be used to interact with a remote displaying service are considered to form another service family.

Accordingly, a service family characterizes an objective of the services belonging to that service family.

It is to be noted that a web runtime environment or a script module can enable a web application to interact with a network service without specifically indicating which type of network service should be used (only the service family is required). Accordingly, a service request does not characterize a specific service but an objective of a service that is to say a service family from which one service can be chosen.

For example, a web application can request the printing of a document without indicating which technology should be used. A possible service type is an IPP printer while another possible service type may be a Google Cloud Print printer (Google Cloud Print is a trademark).

As another example, when a web application requests remote displaying of data identified with a URL, it does not indicate which technology should be used. Therefore, the web runtime environment or a script module may decide on its own to use, for example, the Miracast technology or the DIAL technology.

Therefore, it may be understood that various types of services (i.e. various technologies providing similar services), belonging to the same service family, may be relied on by a web runtime environment or a script module.

As a consequence, one should make the difference between a "type of service requested by the web app" which corresponds to a service family and a "type of service selected by the web runtime environment or the script module" which corresponds to a particular technology and which is generally defined as a service type (e.g. in the sense of a UPnP service type).

Let's consider a web runtime environment that provides web applications with an API that makes it possible to request specific types of services. This means that a web application cannot request a generic service such as "print" (i.e. cannot request a service family). Instead, it should indicate a specific type of network printing service (e.g. "ipp" may be defined as an identifier indicating a printing service supporting "ipp" protocol).

If the provided type is known by the web runtime environment, the web runtime environment can perform discovery. If a matching service is discovered and selected by user, it is further considered that:

a driver application associated with the matching service is determined and loaded by the web runtime environment; and a communication channel is established by the web runtime environment between the web application and the driver application. Along with a set of messages that may be exchanged, this communication channel defines an interface between the web application and the driver application.

In this context, a web application can therefore request a specific type of service and interact with a corresponding service. However, there are generally different types of service which are similar (types that belong to the same family), but each type defines a specific interface, with specific messages. Therefore, in order for a web application not to have to handle on its own different types of services, embodiments may be implemented through a script module which defines a common interface for a set of service types. The script module role therefore consists in simplifying:

the service discovery process. To do so, the web application does not have to indicate specific types of services to the web runtime environment, but just to use the common interface defined by script module, e.g. module.print( ) in order to request the selection of a printer. The script module then relies on the generic service discovery API provided by the web runtime environment to request the discovery of the service types it supports and that correspond to the web application request (e.g. printing services), and the interaction with the driver. The web application does not have to use a specific interface that depends on the actual type of the selected service. Instead, it uses the common interface defined by the script module, which can adapt web application requests made through the common interface to the specific interface of the selected service, based on its knowledge of the service.

For the sake of illustration, the following description is mainly based on two examples of services, one being directed to printing and the other one to remote displaying. These two services belong to two different families of services which are accessible to web applications through web runtime environments. However, it is to be understood that the invention is not limited to these two services. Other types of services can be requested according to the method and device of the invention.

Still for the sake of illustration, network service discovery and publishing services can be requested according to the method and device of the invention. Assuming that an API may allow web applications to request discovery of services or to request publication of services, a particular embodiment of the invention is directed to processing such service requests. In such a case, a web driver application would be obtained from a device that performs service discovery and publication. Such a service could be provided, for example, by a network node acting as a service registry.

As described above, web applications can typically print data, for example using the JavaScript function known as window.print( ). Processing of such a function is generally handled by the web runtime environment which typically obtains the HTML code for the page to be printed, this code being possibly adapted to printing, for example by removing background image or changing text formatting. Next, the web runtime environment uses appropriate resources for printing obtained data.

For the sake of illustration, a web runtime environment which is executed on a personal desktop computer typically uses a printing API provided by the operating system. This printing API is able to communicate with printers thanks to operating system specific drivers that have been previously installed on the desktop computer. Still for the sake of illustration, a web runtime environment can use a Cloud printing solution such as Google Cloud Print. In such a case, the data to be printed are transmitted by the web runtime environment to the Cloud printing solution which is then responsible for printing the provided data.

A particular embodiment of the invention can be considered as an alternative to the standard window.print( ) function and to the Cloud printing solution. However, even though the case of the window.print( ) function is described, other APIs enabling a web application to print data through a web runtime environment can be considered.

As mentioned above, the Presentation API is an API which has been discussed by the W3C Second Screen Presentation Community Group from 2013. It is currently under a standardization process. It basically enables a web application to request the display of data (typically indicated with a URL) on a remote display.

After a web runtime environment has discovered available remote displays, it presents a list of these available remote displays to the user so that the latter can select one. Once the user has selected one remote display, the web runtime environment can display previously obtained data on the selected remote display. To that end, the web runtime environment can load data, render them in a separate context (for example as if the rendered data were to be displayed in the same web runtime environment), produce a video stream from the rendered data, and send this video stream to the selected remote display (e.g. through a video streaming technology such as Miracast).

Alternatively, if the selected remote display comprises a web runtime environment (second web runtime environment), the first web runtime environment can transmit the previously obtained data to be displayed to the remote display which loads and renders the transmitted data through its own web runtime environment.

It is to be noted that according to the Presentation API, both the requesting web application (i.e. the web application which requests the remote display of data) and the remote web application (i.e. the web application which displays data in response to a request) should be able to exchange messages through similar APIs. If messages can be easily exchanged when both web applications are executed by the same web runtime environment, interoperability conditions are required when the requesting web application and the remote web application are executed in two different web runtime environments.

As a response to the interoperability condition issue, it has been suggested to define a common discovery protocol and a common communication protocol. Such a discovery protocol would allow discovery of "remote display with WRE" services. The communication protocol would typically aim at enabling requesting display of data and exchanging messages between web runtime environments.

Figure 2A:
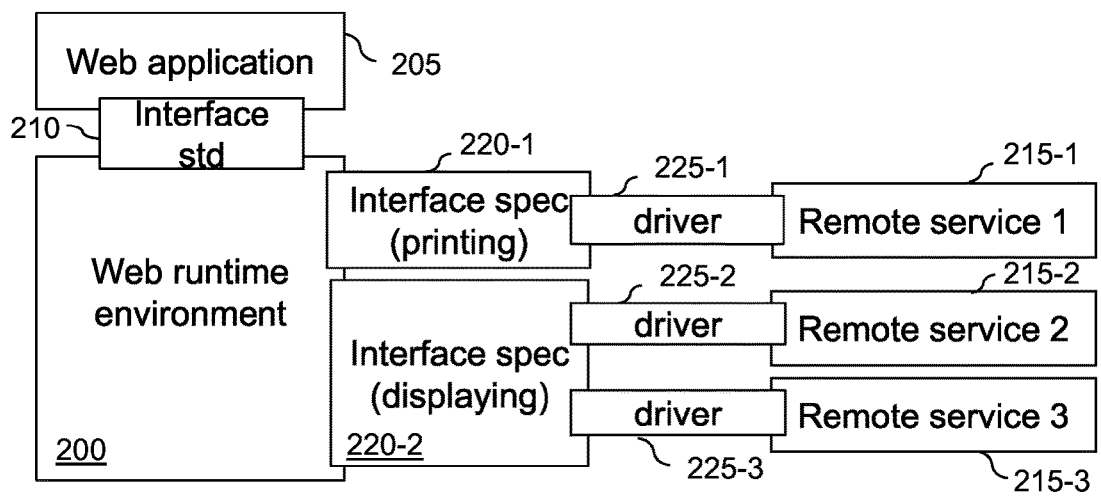
FIGS. 2a-2b illustrate exemplary logical architectures of embodiments of the invention.

FIG. 2a illustrates an example of the logical architecture of an embodiment of the invention.

As illustrated, web runtime environment 200 interacts with web application 205 through standard interface 210 (interface std). Web runtime environment 200 further interacts with services 215-1 to 215-3, for example remote services, through specific interface 220-1 and 220-2 (interface spec) and web driver applications 225-1 to 225-3 (driver).

According to the given example, each specific interface corresponds to a particular service family (e.g. a printing service or a remote displaying service) and each web driver application corresponds to a particular service family (e.g. a printing service or a remote displaying service) and to a particular technology, typically a particular communication technology.

For the sake of illustration, specific interface 220-2 corresponds to a remote display service family. Specific interface 220-2 gives access to services 215-2 and 215-3 through drivers 225-2 and 225-3, respectively. Still for the sake of illustration, drivers 225-2 and 225-3 may conform to the XmlHttpRequest model or the WebSocket protocol, respectively.

Standard interface 210 may conform to the JavaScript language.

Figure 2B:
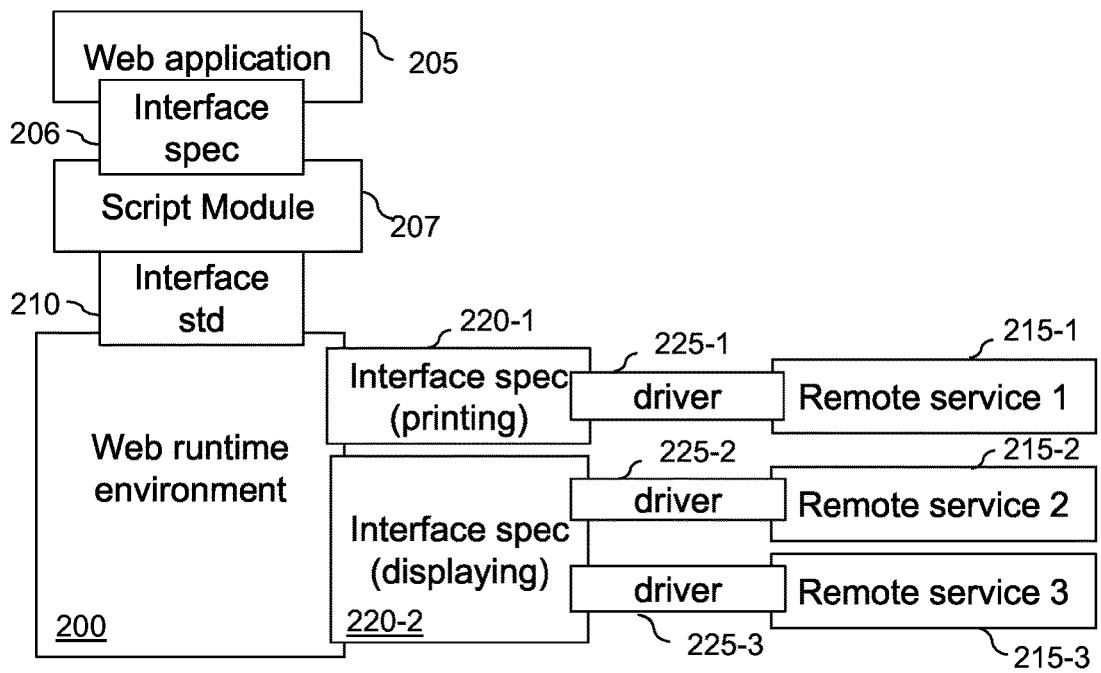

FIG. 2b illustrates another exemplary logical architecture according to embodiments. Compared to the previous example of FIG. 2a, this example is characterized by the presence of a script module 207.

As illustrated, the script module 207 interacts with web application 205 through an interface 206 (Interface spec). Script module 207 also interacts with web runtime environment 200 through standard interface 210 (Interface std). Web runtime environment 200 further interacts with services 215-1 to 215-3, for example remote services, through specific interfaces 220-1 and 220-2 (Interface spec) and web driver applications 225-1 to 225-3 (driver).

According to the given example, each specific interface corresponds to a particular service family (e.g. a printing service or a remote displaying service) and each web driver application corresponds to a particular service family (e.g. a printing service or a remote displaying service) and to a particular technology, typically a particular communication technology.

For example, interface 220-2 corresponds to a remote display service family, interface 220-2 gives access to services 215-2 and 215-3 through drivers 225-2 and 225-3, respectively. Also, drivers 225-2 and 225-3 may conform to the XmlHttpRequest model or the WebSocket protocol, respectively.

Standard interfaces 206 and 210 may conform to the JavaScript language.

As described by reference to FIGS. 3 to 6, each web driver application is associated with a service and obtained selectively when the corresponding service is requested.

Figure 3:
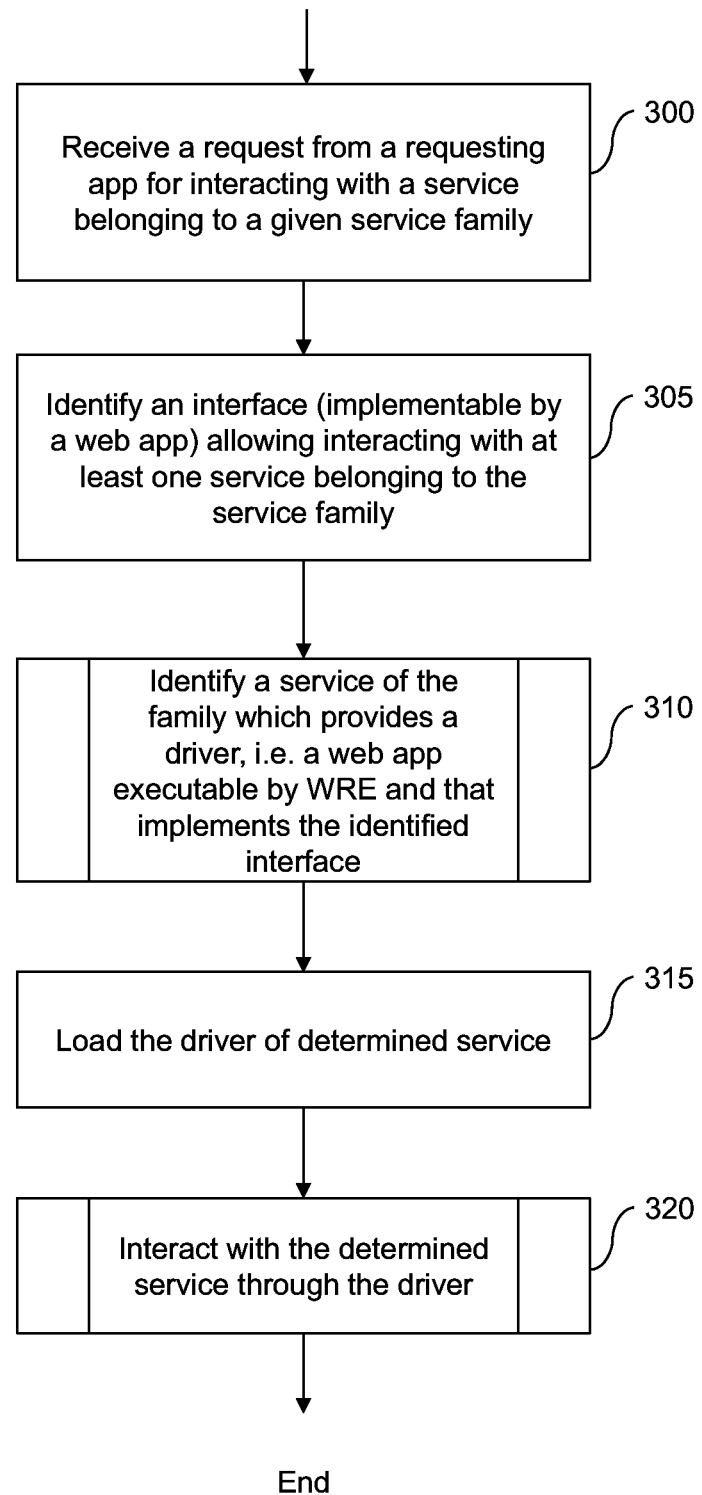
FIG. 3 illustrates an example of steps to be carried out in a web runtime environment implementing the invention according to a particular embodiment.

FIG. 3 illustrates an example of steps to be carried out in a web runtime environment implementing the invention according to a particular embodiment, possibly in combination with a script module.

As illustrated, a service request is received in a first step (300). The service request is received from a requesting application, typically a web application executed by a web runtime environment. According to a particular example, the service request is received by the web runtime environment or a script module through a JavaScript interface.

According to another example, the requesting application, for example a native application (i.e. an application written for a specific platform), may rely on the web runtime environment through an interface made available by the web runtime environment to other applications in order to provide it with a service request.

Still according to a particular example, the web runtime environment itself or one of its components is the requesting application.

The service request received by the web runtime environment is directed to a particular service family, that is to say a set of services sharing the same features, for example the same objective. It is to be noted that the selection of a particular service in the set of services of the service family is delegated to the web runtime environment.

In other words, a requesting application requests to interact with a given family of services (e.g. printing services or remote displaying services) whatever the requested service is. It does not indicate which service type should be used. Selection and communication with an instance of a service is delegated to the web runtime environment, possibly in conjunction with a script module. The web runtime environment and the script module may be compatible with various service types for a considered service family.

An example of a service request is a request for printing data. A web application executed by a web runtime environment can request such a service by calling the window.print( ) function.

According to another example, a service request can be directed to remote displaying of data defined by a URL through a dedicated interface.

Next, at step 305, an API which can be used by the web runtime environment (i.e. an interface that is compatible with or understandable by the web runtime environment), which can be implemented by a web application, and which allows interaction with at least one service of the set of services of the requested service family, typically a JavaScript API, is identified.

The identified interface depends on the service request and more specifically on the service family associated with the service request. For each service family, various kinds of interfaces may be designed.

For example, in the case of printing services, a possible API defines functions enabling requesting creation of a print job and printing a page.

Alternatively, another possible interface would consist in defining means allowing sending and receiving messages, along with a set of messages associated with similar operations (creation of a print job and printing of a page)

Once such an interface is defined, the web runtime environment can execute a web application implementing this API and can call the functions provided by this interface, for example to print data.

Accordingly, a printing service can make itself compatible with a web runtime environment aware of such an interface by providing a web application implementing this interface. Since such a web application allows interacting with a service, it is referred to below as a driver application or a web driver application.

Next, at step 305, a service belonging to the service family corresponding to the service request and providing a web driver application implementing the identified interface is identified. This step is further described by reference to FIG. 4.

It is to be noted that according to a particular embodiment, several interface s are identified at step 305. Then, at step 310, a service belonging to the service family corresponding to the service request and providing a web driver application implementing one of the identified interfaces is identified.

Once such a service has been identified, the corresponding web driver application is loaded in the web runtime environment at step 315.

The loading process depends on features of the identified service to make its web driver application available. Such features are known to the web runtime environment after having identified a service, that is to say on completion of step 310. For example, a service may provide a URL indicating where its web driver application is located. In such a case, the loading step (i.e. step 315) mainly consists, for the web runtime environment, of requesting this URL in order to obtain the web driver application and to execute it.

After having loaded the web driver application, the web runtime environment or a script module can use it to interact with the identified service thanks to the identified interface (step 320). This step is further described in reference to FIG. 5.

It is to be noted that the loading step is an optional step since the web driver application may have already been loaded by the web runtime environment (prior to step 315). This may occur, for example, if another application has requested the same service previously and if the same service provider has been selected. As another example, if this web driver application is frequently used or if the web driver application corresponds to a default service provider defined by a current user, the web runtime environment may be configured to load it in advance so as to start interaction with an identified service more quickly.

If no service request is being processed through a web driver application, the latter can be used to process a newly received service request. However, if another service is already being processed, the web runtime environment should check whether the web driver application is adapted to process multiple service requests in a parallel way. This typically depends on the web driver application but also on the identified interface that is used by the web driver application (i.e. the interface identified at step 350).

As a matter of fact, a given interface may allow parallel handling of service requests while another may not. However, even in the case according to which parallel handling is possible, a given web driver application may or may not implement it unless it is mandatory. Accordingly, the web runtime environment should be able to determine whether parallel handling is supported or not (if its implementation is optional), for example through a specific function.

A possible way of enabling the support of parallel service requests is to associate a specific identifier with each service request and to make this identifier available for each interaction between the web runtime environment or the script module and the web driver application. According to another solution, a specific object is instantiated for each request by both the web runtime environment and the web driver application, interactions being then made through these objects. In the case of a script module, the web runtime environment may provide the script module with the objects. It is to be noted that a web driver application has a specific role compared to other web applications, which consists in interfacing a web runtime environment or a script module and a service. Therefore, a specific execution environment is to be defined for web driver applications, typically by forbidding and/or allowing access to specific features. For example, a web driver application may be allowed to establish a connection only with the associated service and/or with the server hosting the associated service. According to that example, the web driver application can obtain resources or exchange messages only with this service and/or this server.

Similarly, accessing features of the device wherein the web runtime environment is implemented may not be allowed to the web driver application as it generally does not need to access such features (for example a camera or a compass).

According to another example, if specific security constraints are met, a web driver application may be allowed to access specific interfaces provided by the web runtime environment, such as an API providing a low-level control of a remote device over a connection to that remote device. Such a low-level control can be, for example, a full control over a UDP (User Datagram Protocol) or TCP (Transmission Control Protocol) connection (in contrast to connections based on specific models or protocols such as those known as XmlHttpRequest or WebSocket which are both generally accessible to web applications).

Another particularity of a web driver application is that it may not need to be displayed to user. Indeed, depending on the considered service, the web driver application may only be used by the web runtime application (i.e. not directly used by the user). For example, in the case of a remote displaying service, the web driver application is generally only used by the web runtime application to interact with the service. In such a case, there is no need to display data in relation to the web driver application, which may therefore not be displayed to a user. However, in certain circumstances, a web driver application can be used to make it possible for a user to enter data. For example, in the case of a printing service, the web driver application can be used to enable a user to set printing parameters.

Figure 4:
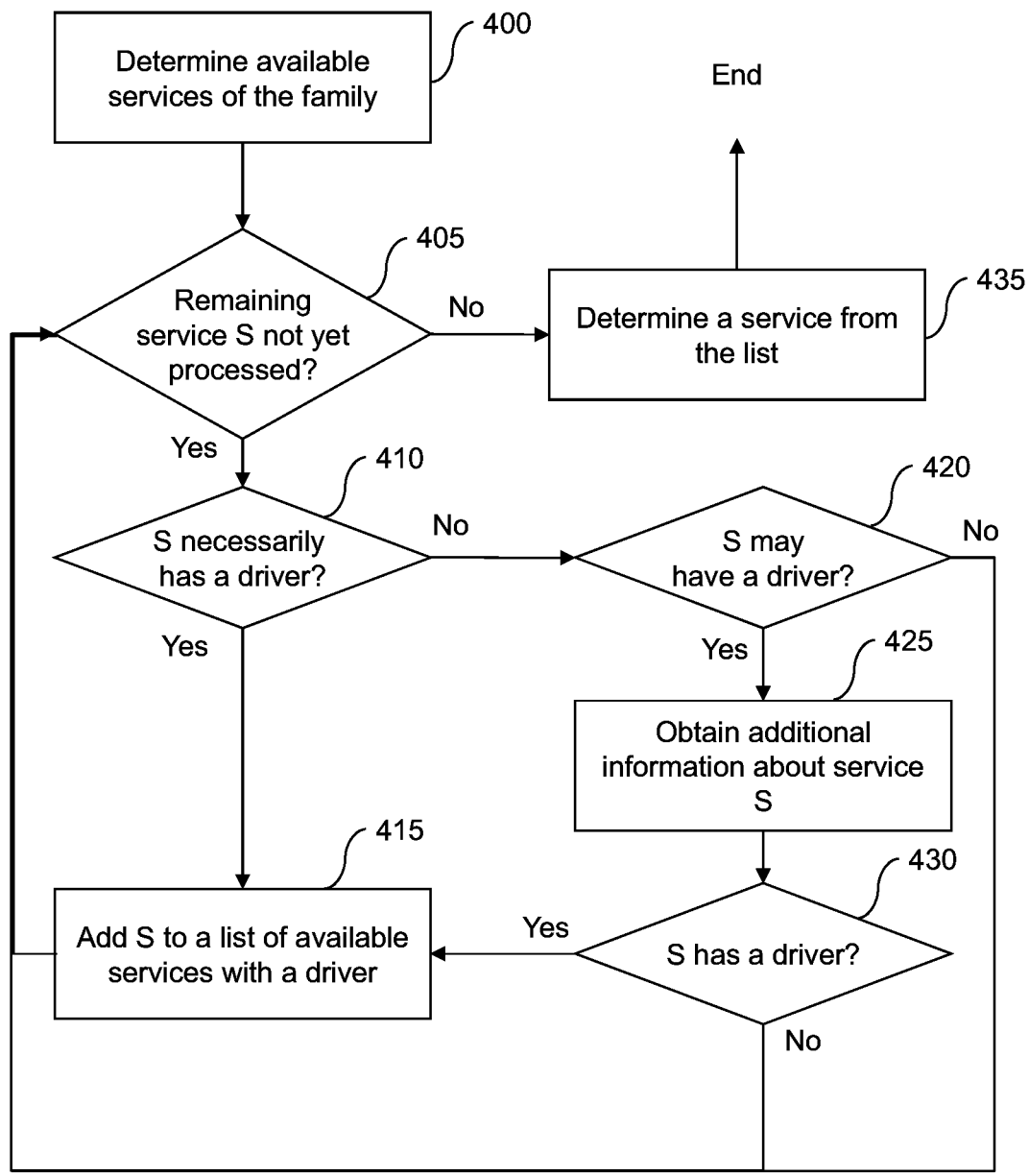
FIG. 4 illustrates an example of steps for identifying a service belonging to the service family corresponding to a given service request and providing a web driver application implementing an identified API.

FIG. 4 illustrates an example of steps for identifying a service belonging to the service family corresponding to a given service request and providing a web driver application implementing an identified API, as disclosed by reference to step 310 of FIG. 3.

As illustrated, a first step (step 400) is directed to determining available services belonging to the considered family of services.

It is to be noted that a given web runtime environment may not be aware of all the possible service types belonging to a given service family, hence it may ignore some services that could actually be used provided the web runtime environment could discover them.

Determining available services generally starts by a discovery step. A discovery step typically involves the use of discovery protocols such as mDNS, DNS-SD (DNS Service Discovery) or SSDP (Simple Service Discovery Protocol).

Proximity-based discovery process may also be used. Such a process can be based, for example, on technologies such as NFC (Near Field Communication) or Bluetooth LE (Bluetooth is a trademark). An advantage of such a process is directed to security since it requires the user to be physically present nearby the device providing the service.

Services may also be discovered thanks to sharing of information with another device (for example a device from another user in the same place) or thanks to a service (for example a synchronization service allowing synchronization of user data between various web runtime environments, previously discovered services being obtained by a newly used web runtime environment).

As another example, a user may also directly input the settings of a service in a web runtime environment (for example by indicating a service type and network parameters) so that the latter may be aware of it.

It is also to be noted that a discovery process may also be done, wholly or partially, prior to receiving a service request in the web runtime environment. According to that discovery process, available services can be determined more quickly, providing a better user experience. However, an issue of such a discovery process lies in the fact that if the list of available services has not been recently refreshed, services of the list can be no more available. Therefore, checking that services are actually available is important in such a case.

Once available services have been determined, the web runtime environment has to determine the ones which provide a web driver application implementing the identified interface.

To that end, the list of available services is processed.

After having determined the list of available services at step 400, a test is carried out to determine whether or not there remains an available service S not yet processed in the list (step 405).

If the list of available services comprises an available service S not yet processed, a second test is carried out to determine whether or not service S is necessarily associated with a web driver application implementing the identified interface (step 410). Details regarding the circumstances under which service S is necessarily associated with a web driver application implementing the identified interface are given herein below.

If service S is necessarily associated with a web driver application implementing the identified interface, service S is added to a list of available services providing a driver (step 415).

On the contrary, if service S is not necessarily associated with a web driver application implementing the identified interface, a third step is carried out to determine whether or not service S may provide a web driver application (step 420).

If service S may provide a web driver application, additional information about service S is obtained (step 425) so that it can be determined whether or not service S actually provides a web driver application (step 430).

If service S actually provides a web driver application, step 430 is followed by step 415 according to which service S is added to a list of available services providing a driver.

On the contrary, if service S may not provide a web driver application (step 420), that is to say if it is determined that service S belongs to a type of service that never provides a web driver application, or if it is determined that service S does not provide a web driver application at step 430, the process is branched to step 405.

Similarly, after adding a service in the list of available services with a driver (step 415), the process is branched to step 405.

After having processed all the services of the list of available services (as determined at step 405), a service is selected (step 435) and the process ends.

Selecting a service (step 435) may be achieved, for instance, by having the web runtime environment display the list of identified services to a user.

Alternatively, a user may have identified a default service to be used so that, if this service is actually available, the service is automatically selected. It is to be noted that in such a case, the web runtime environment may focus on monitoring the availability of that service. This may prove to be particularly useful for mobile devices, as focusing on a single service may help reduce battery usage.

Depending on the considered type of service, a driver may or may not be available. Therefore, various options may be chosen by service providers.

For example, it may be decided to make it impossible to select a service of a service type that does not provide a web driver application as defined herein above. On the contrary, regarding a service of a service type that necessarily provides a web driver application, a web runtime environment may determine that the corresponding web driver application is available when discovering that service.

Considering service type that may provide a web driver application, a web runtime environment needs information to determine whether or not the web driver application is available when discovering a service of that type.

Considering service types that necessarily provide a web driver application or that may provide a web driver application, various means can be used to determine whether or not a web driver application is available and/or how to obtain it.

According to a particular example, discovery information comprises driver-related information. For the sake of illustration, discovery information may comprise a URL giving access to the web driver application. If the URL is not provided within discovery information, a web runtime environment understands that no web driver application is available.

However, it is to be noted that the amount of discovery information is generally very small so as to minimize the amount of traffic related to the discovery process. Therefore, it may not be possible to include such information in the discovery data. In such a case, the web runtime environment may have to obtain a configuration file provided by the service, this configuration file comprising the URL of the web driver application.

According to another solution, a predefined URL is used. It enables a web driver application to be obtained once service network parameters (e.g. IP address and port) have been discovered. This solution is particularly adapted to handle services which necessarily provide web driver applications. If a web driver application is optional for a service, an empty response or an error indication received in response to a request for the predefined URL is interpreted by the web runtime environment as an absence of web driver application.

It is also to be noted that a service may provide different web driver applications in its service description. For example, a local URL corresponding to a local version of a web driver application may be provided (i.e. a web driver application hosted in the same device as the one providing the service) and a cloud URL corresponding to a remote version of the web driver application may also be provided. In such a case, it may be assumed that the local version may be a simple version, not necessarily up-to-date, while the cloud version may comprise more features and be more recent. A web runtime environment may then use the cloud URL if it can access it and the local version if the cloud version is not available.

It is also to be noted that while web driver applications generally implement a single determined interface, there exist cases in which a device implements multiple services, these services belonging to different service families. In such a situation, the device may provide multiple web driver applications (e.g. one for each interface associated with a service family) or a single web driver application implementing all the interfaces associated with the considered service families. Depending on the number of services and interfaces supported, the one or the other solution may be more convenient.

In addition, a service may also provide a generic web driver application that could obtain the interface associated with the considered service family when loaded and then obtain the corresponding code from that service or from another device at loading time. In particular, in addition to the service family, another parameter may be provided by the requesting application, for example an indication as to whether or not many exchanges are expected with the remote device or whether or not fast exchanges are required. For example, such a parameter may be used by a web driver application to select its communication channel with the remote service. For the sake of illustration, if few exchanges are expected or if a slow communication channel may be used, communication may be based on the XmlHttpRequest model. On the contrary, if many exchanges are expected or if a fast communication channel is needed, communication may be based on the WebSocket protocol.

Figure 5:
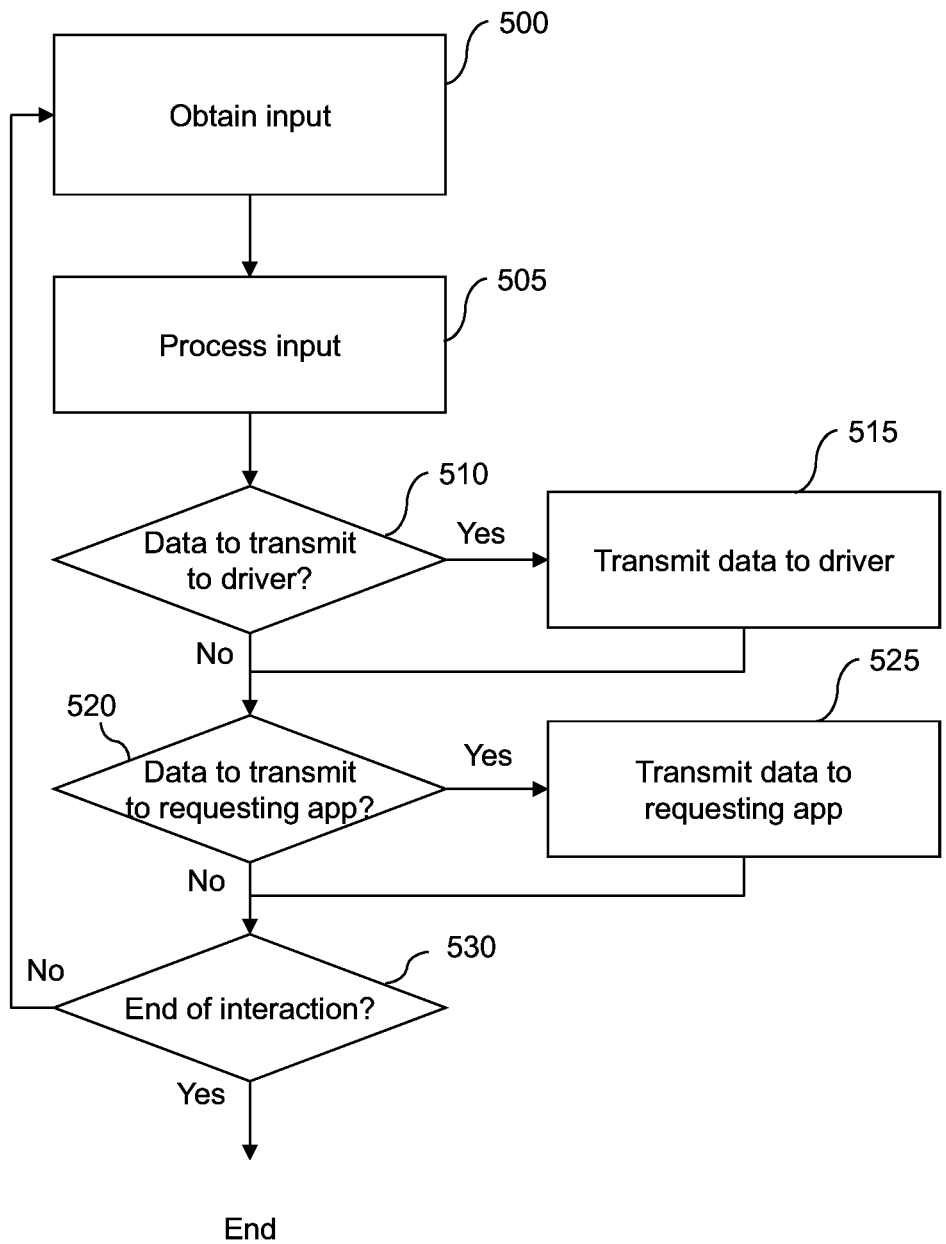
FIG. 5 illustrates steps of a process enabling interaction with a web driver application in order to provide a service requested by a requesting application.

FIG. 5 illustrates steps of a process enabling interaction with a web driver application in order to provide a service requested by a requesting application.

As illustrated, a first step (step 500) aims at obtaining an input in a web runtime environment or in the script module. For the sake of illustration, the input obtained by the web runtime environment or by the script module can be HTML data to be printed in the case of a printing request or a URL defining data to be displayed in the case of a remote displaying request.

Such an input may be obtained along with a service request or independently. For example, in the case of a remote displaying request, the requesting application can provide the web runtime environment or the script module with data which are transmitted to the remote displaying application.

According to another example, the input is provided by a web driver application. For the sake of illustration, in the case of a printing service, a web driver application may obtain the status of a print job (e.g. number of pages already printed or an indication of a printing error). Such a status may then be transmitted to the web runtime environment or the script module through specific means provided by the identified interface allowing the web runtime application or the script module and the identified web driver application to interact (e.g. the provideStatus( ) function or "provideStatus" message). The web runtime environment or the script module may also obtain an input through their own components or through external components. For example, an indication of a network connection failure may be an input obtained by the web runtime environment or the script module at step 500. Since there exist cases for which an input has to be modified prior to use, the input obtained at step 500 is processed at step 505 (if needed). For example, in the case of a printing service, the input data can be obtained as an HTML document that needs to be converted into a printable format, for example the Adobe PDF format (Adobe is a trademark), prior to being provided to the corresponding web driver application. Accordingly, step 505 can be directed to the conversion of an HTML document, in a web runtime environment (possibly in conjunction with a script module), into a PDF document comprising one or several pages and being printable.

According to another example directed to remote displaying services, a video stream is created, in a web runtime environment (possibly in conjunction with a script module), from data provided by a requesting application in order to be provided to a web driver application. The video stream can be created from a URL after a rendering step.

It is to be noted that in particular cases, the obtained input does not have to be modified and thus, can be directly transmitted to a web driver application. However, in such cases, minimal processing may still be performed, for instance to check input data validity with regard to certain constraints. In the case of a remote displaying service, a web driver application may accept a URL as an input from the web runtime environment or from the script module (so that the data corresponding to the URL are remotely displayed), this URL being typically directly provided by the requesting application. In this case, the processing of the URL may consist in checking that it is correctly formatted or that it belongs to an authorized domain.

After having processed the input (if needed), a first test is carried out to determine whether or not data are to be transmitted to the identified web driver application (step 510). The data to be transmitted may be the obtained input, a part of the obtained input, the processed obtained input, a part of the processed input data, complementary data related to service execution, or a combination thereof.

If data are to be transmitted to the identified web driver application, they are transmitted at step 515. Such transmission is achieved through one or more interactions involving the interface implemented by the identified web driver application. Transmission may be achieved, for example, by calling a function defined by this interface or by triggering an event defined by this interface, in the web runtime environment or the script module. The web runtime environment or the script module may also send a specific message defined by the interface.

The transmitted data may be modified to take into account specific constraints of the identified web driver application and/or of the service. In particular, they can be encoded in a specific way in order to be compatible with the interface or to enable a greater processing efficiency by the web driver application and/or by the service.

If data are not to be transmitted to the identified web driver application or after having transmitted the data to the identified web driver application, a second test is carried out to determine whether or not data are to be transmitted to the requesting application (step 520).

If data are to be transmitted to the requesting application, they are transmitted to the requesting application at step 525.

As described with reference to step 515, data transmission may involve interaction with the requesting application and the transmitted data may be modified to take into account specific constraints of the requesting application. In particular, it may be encoded in a specific way so as to be compatible with the interface used to transmit the data to the requesting application or to enable greater processing efficiency by the requesting application.

According to a particular example, if the input obtained at step 500 is an indication of a connection error with a remote display or if this input corresponds to a message from a remotely displayed application (the message being intended for the requesting application), the web runtime environment or the script module should inform the requesting application of such events.

According to another example, if a connection has been established with a remote display (through a web driver application), the web runtime environment or the script module may return a specific object to the requesting application enabling this application to provide messages to the remotely displayed application. In the case according to which the requesting application is a web application executed by the web runtime environment, the transmission is typically achieved by calling a specific function of a given API, by triggering an event of a given API, or by sending a specific message through a considered interface which defines such kinds of messages. In the case according to which the requesting application is not a web application executed by the web runtime environment, alternative interfaces may be used, such as native interfaces enabling a native application to interact with a web runtime environment.

Next, if no data are to be transmitted to the requesting application (step 520) or after having transmitted data to the requesting application (step 525), a third test is carried out to determine whether or not the interaction should end (step 530).

The third test can be based on the type of obtained input (e.g. the web driver application or the requesting application may explicitly request the end of the interaction) or can be based on the result of processing of the obtained input.

If the interaction should not end, the process is branched to step 500 so as to obtain another input. On the contrary, if the interaction should end, no more input is obtained and the process ends. In such a case, steps 515 and 525 are generally previously carried out in order to notify the web driver application and the requesting application that the interaction is about to end.

It is to be noted that there exist cases wherein the inputs obtained at step 500 come from a user.

For example, there exist web driver applications that display an interface enabling a user to enter inputs. For the sake of illustration, a web driver application used to interact with a printing service typically enables a user to select parameters such as a number of copies or a paper format. To that end, the web runtime environment displays an interface associated with the web driver application and waits for user inputs.

Whether an interface associated with the driver should be displayed or not may depend on the considered service family or on the determined interface. Alternatively, the driver or the service description associated with the considered service may indicate whether an interface associated with the driver should be displayed or not (since there exist cases wherein there is no input to be obtained from a user and thus no need for displaying a driver interface). Still for the sake of illustration, a web driver application interface is displayed, for a remote displaying service, when a user is asked to enter specific settings such as an image resolution or an image frequency.

According to another example, inputs that should be obtained from a user can be obtained without displaying any interface associated with a web driver application. This is typically the case when default parameter values are defined by the web driver application, in the description of the service, or by the web runtime environment or the script module. In such a case, the web runtime environment or the script module displays a specific interface that it generates based on the defined parameter values. Alternatively, these values are defined as a part of the interface identified at step 305 of FIG. 3.

Therefore, an interface associated with a web driver application can be displayed so that, for example, a user can enter parameter values that are needed by the identified service. Once inputs have been obtained from a user, there is no need to display the interface anymore. Accordingly, in a particular embodiment, the web runtime environment or the script module determines that needed inputs have been obtained and thus, that displaying an interface associated with the driver is no more useful. Accordingly, the web runtime environment or the script module switches the interface display to another one, typically the one from the requesting application, even though the web driver application is still being executed.

The way the web runtime environment or the script module determines that the needed inputs have been obtained may be related to an interface used by the web driver application. For example, in the case of a printing service, a specific function or a specific message may allow the web driver application to indicate to the web runtime environment or to the script module that printing can start once the needed parameter values have been obtained. Accordingly, the web runtime environment or the script module relies on call to that function or reception of the message to determine that interface display is no longer needed. A similar function or message may be defined and relied on in the case of a remote displaying service, this function or message indicating that the remote display may start given that all parameter values have been defined by the user.

Once interface display ends, a dedicated user interface component may still be present in order to allow a user to change the values of defined parameters or even to stop the execution of the service.

Figure 6:
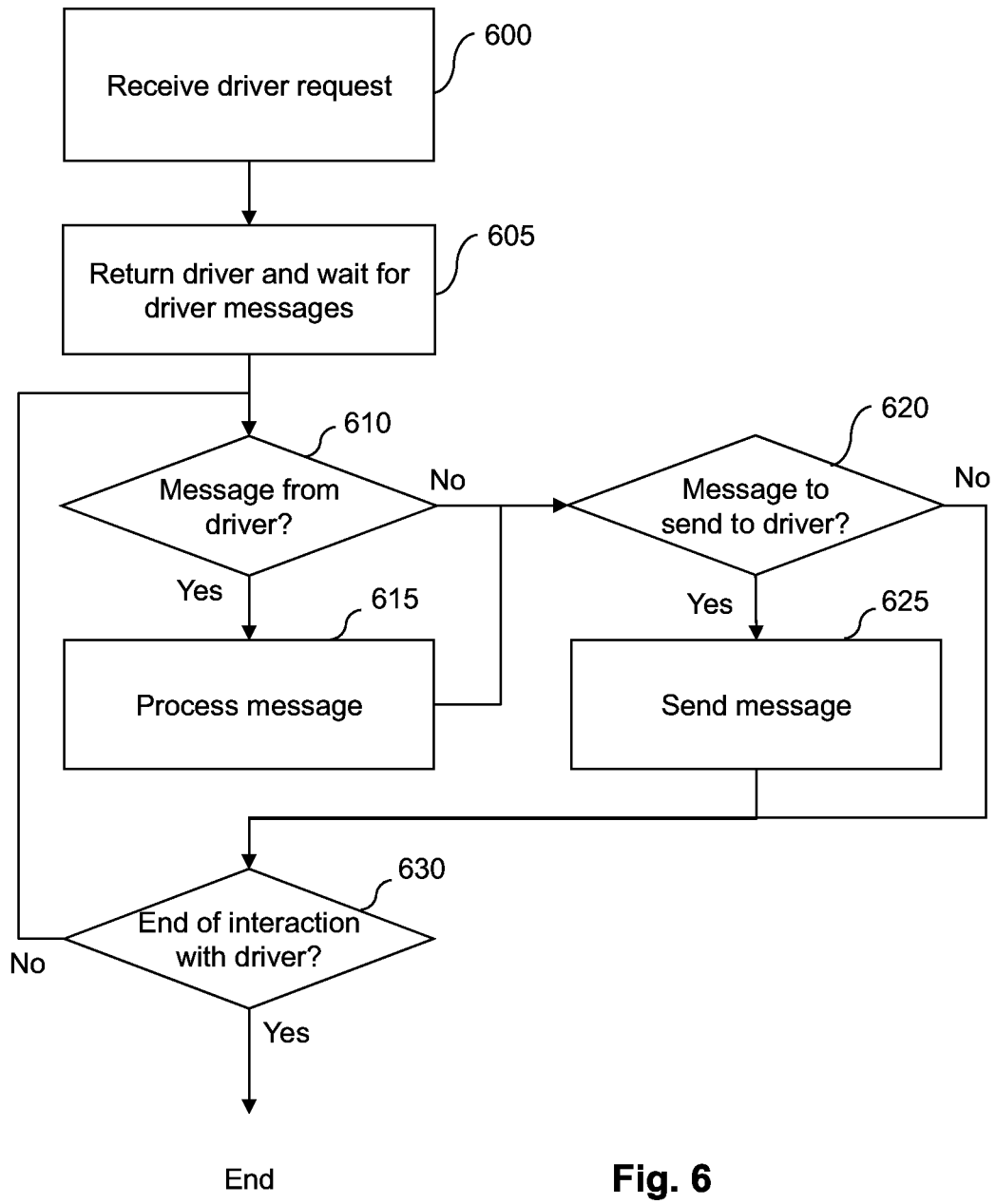
FIG. 6 illustrates an example of steps carried out by a service providing a web driver application.

In the case where a script module is used, the process of FIG. 5 is controlled by both the script module and the web runtime environment. The script module is executed by the web runtime environment. Hence, it necessarily relies on the web runtime environment. In particular, in order to interact with the driver through the interface considered, it relies on the web runtime environment. For instance, if the considered interface is a generic communication channel associated with a set of messages, the web runtime environment is responsible for establishing the communication channel and transmitting the messages between the script module and the driver. Similarly, if the script module relies on a generic discovery interface provided by the web runtime environment to discover services, the web runtime environment may provide the script module with a specific object upon selection of a service, the object allowing the script module to interact with the service. In this case, based on the received object, the script module may provide the requesting web application with another object that enables the web application to interact with the script module (in order to interact with the selected service). FIG. 6 illustrates an example of steps carried out by a service providing a web driver application.

For the sake of illustration, it is assumed that the service hosts its own web driver application. However, it is to be noted that, in a more general context, the web driver application can be stored remotely. In particular, a service may rely on a web driver application which is hosted in a remote server such as a cloud server.

As illustrated, a first step (step 600) is directed to receiving a request (in the service) for a web driver application. Depending on how the service made its web driver application available, different types of request may be received. For example, an HTTP request at a specific URL may be done in order to obtain the web driver application.

Next, at step 605, the web driver application is returned to the requesting device and the service waits for a driver message. Generally speaking, the service may always be waiting for driver messages but it may be more efficient and it may increase security to enable this feature only when a request for a driver has been made.

In a following step (step 610), it is checked whether or not a message has been received from the web driver application.

If a message has been received from the web driver application, the received message is processed (step 615). Depending on the type of service, various messages implying various processing may be received. As an example, in the case of a printing service, a message may be a request for creating a new job and obtaining its identifier. Alternatively, a message may be a request for printing a page.

As another example, in the case of a remote displaying service for displaying data associated with a URL, a message may be a request to locally render these URLs and display them. Still for example, the message may be a request to provide a message to the remote display for rendering data associated with the URL. If the remote display is not able to display data associated with a URL but only images and video frames, then a message may comprise these data so that they can be displayed.

If no message has been received from the web driver application (step 610) or after having processed a message received from the web driver application (step 615), a test is carried out to determine whether or not a message should be sent to the web driver application (step 620).

If a message should be sent to the web driver application, the message is sent at step 625. It is to be noted that a message may be sent to a web driver application in various circumstances depending on the considered service. In the case of a printing service, a message may comprise a print job identifier and/or a status regarding a print job such as a number of printed pages or a printing error.

In the case of a remote displaying service which renders data associated with a URL, a message may be provided by the application displaying the data on the remote device to the service which, in turn, forwards the message to the web driver application. Depending on the means chosen for the communication between the service and the web driver application, such forwarded messages may be modified prior to being transmitted to the web driver application (e.g. in order to adapt them to the communication channel between the service and the web driver application). For example, messages may be converted to a different format, especially a more compact format or a format easier to process for the web driver application.

It is to be noted that several messages can be sent at step 625 in order to have the remote service to perform a specific task.

The same type of processing may occur when the web driver application is to transmit data obtained from the web runtime environment to the service (e.g. in order to reduce the size of the data transmitted or to reduce the amount of processing to be performed by the service).

If no message is to be sent to the web driver application (step 620) or after having sent one or several messages to the web driver application (step 625), it is checked whether or not interaction with the web driver application should end (step 630).

According to a particular embodiment, this is determined as a function of messages received from the web driver application, for example a message from the web runtime environment or the script module requesting the web driver application to end the interaction, or as a function of events detected by the service, for example deactivation of the service by a user.

It should be noted that if interaction with the web driver application should end, a specific message may be sent to the web driver application to indicate that the interaction is about to end. In such a case, the interaction ends; otherwise, the process is branched to step 610.

FIGS. 3 to 6 illustrates embodiments enabling a web runtime environment or a script module to interact with a web driver application, the latter interacting with a service. Therefore, these embodiments enable a web driver application and a service to rely on their preferred communication means. For example, if the service is associated with a web server, the web driver application may use the XmlHttpRequest model in order to exchange messages with the service. Alternatively, if a WebSocket server is associated with the service, a connection conforming to the WebSocket protocol may be used.

Moreover, as described with regard to the execution environment of the web driver application, a web driver application may be granted access to specific interfaces (e.g. low-level UDP or TCP API), especially if security constraints are met (e.g. pairing of the device executing the web runtime environment and of the device executing the service thanks to a proximity-sensitive technology such as NFC or Bluetooth LE).

According to a particular embodiment directed to the case according to which the device hosting the service also hosts the web driver application, a request of the web runtime environment to the service for a web driver application may comprise parameters that may be used by the service to prepare interaction with the web driver application.

For example, in the case of a remote displaying service of data associated with a URL, the request for the web driver application may comprise this URL. Then, while the web driver application is returned and loaded by the web runtime environment, the service may preload the URL so that it may be displayed more quickly when the web driver application connects to the service. In such a case, it may even be possible not to have the web driver application to request the loading of the URL but only to connect to the service in order to start the remote display session.

Figure 7:
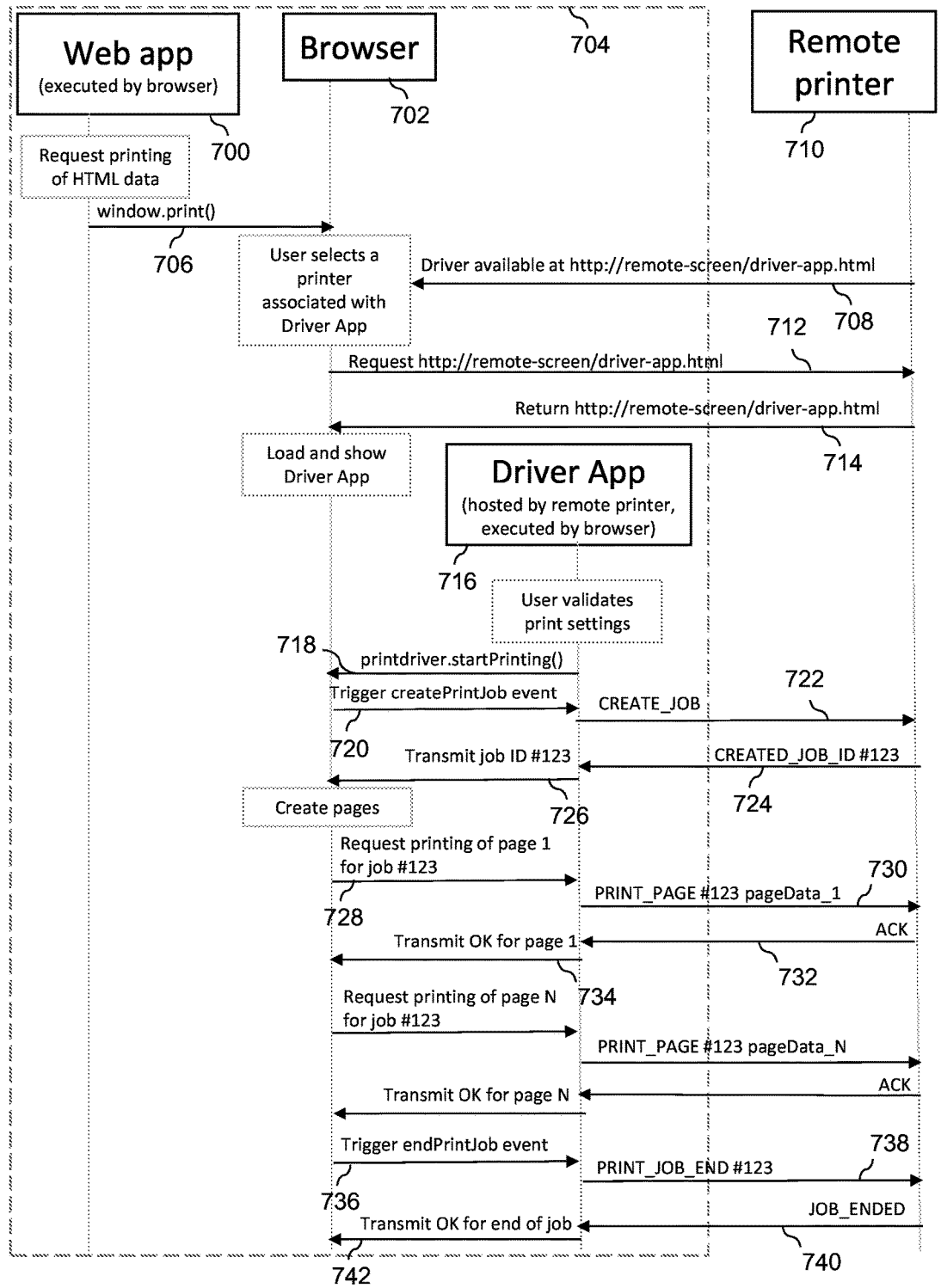
FIG. 7 illustrates an example of implementing an embodiment of the invention to access a printing service.

FIG. 7 illustrates an example of implementing an embodiment of the invention to access a printing service.

For the sake of illustration, web application 700 executed by a web runtime environment, for example web browser 702, in device 704 requests printing of a displayed window (i.e. HTML data) through the window.print( ) JavaScript function (step 706).

Upon reception of the request, browser 702 determines available printers and enables a user to select one of them. In this example, it is assumed that the selected printer is remote printer 710 which provides a web driver application. The way this web driver application can be obtained is typically determined while the printing service is discovered, for instance through a dedicated URL (step 708).

After the user has selected remote printer 710, browser 702 requests the web driver application made available by the printing service (step 712). According to the illustrated example, the web driver application is hosted by the remote printer 710. Hence, when the web driver application is requested, remote printer 710 returns the web driver application (step 714).

In turn, browser 702 loads the web driver application 716 and displays a user interface which is associated with that web driver application so that a user may define print settings (e.g. number of copies).

As described above, the step of displaying a user interface allowing the user to enter parameter values is optional. According to other embodiments, browser 702 may be in charge of obtaining print settings of the user and of transmitting them to the web driver application.

Once the user has validated the settings, web driver application 716 notifies browser 702 that printing may start. In the given example, this is achieved by having the web driver application call the printdriver.startPrinting( ) function (step 718). This function belongs to a specific interface which is defined to enable interaction between a web browser and a driver application.

Although not mentioned in FIG. 7, this interface may also initially allow the browser 702 to provide the data to be printed to web driver application 716 so that a preview may be displayed to the user.

Once browser 702 has received the call to the startPrinting( ) function, it requests the creation of a new print job from the web driver application (step 720). This is achieved, for example, by triggering a specific event associated with the specific interface, for example the printdriver.createPrintJob event.

Alternatively, this may be done by providing a specific message associated with the interface, for instance a JSON message having a "name" property of "createPrintJob" and possibly other properties used in the context of creating a print job.

The web driver application, based on the caught event or received message, sends an appropriate instruction to the remote printer so that a job may be created (step 722), here a "CREATE_JOB" message. Communication between the web driver application and the remote printer may be done in any way, one of the advantages of the invention being directed to letting the web driver application and the service communicate using their preferred means (therefore, as long as it provides a web driver application implementing the considered specific interface, a device manufacturer can use proprietary technologies for communication between the web driver application and a service hosted by one of its devices).

After having received the proper instruction from the web driver application (e.g. the "CREATE_JOB" message), the remote printer returns an acknowledge message (step 724), for example a "CREATED_JOB_ID" message, which comprises the newly created print job identifier (e.g. "#123"). An indication of creation of the print job is then transmitted by web driver application 716 to browser 702 (step 726), still using a means defined by the specific interface, for instance a specific function, a specific event or a specific message.

Next, since the print job has been created, browser 702 creates the data to be printed (e.g. in Adobe PDF format).

For the sake of illustration, it is assumed that the specific API allowing the browser to control the remote printer through the web driver application is based on printing each page individually. Accordingly, browser 702 starts by requesting the printing of the first page associated with job #123 (step 728), for example by triggering a specific event having page data and job identifier as parameters, or by sending a corresponding message. In response to detecting the event, web driver application 716 transmits a message requesting the printing of said page to the remote printer (step 730) which acknowledges this message (step 732). The received acknowledge indication is then transmitted by the web driver application to the browser (step 734). Printing of remaining pages continues on the same principle.

When the last page has been printed, browser 702 preferably triggers another event or sends another message indicating that print job can be ended (step 736). Upon reception of that event, the web driver application sends to the printer a message to the remote printer indicating that print job can be ended (step 738). In response, the remote printer returns a message indicating end of job (step 740). The web driver application then transmits to the browser an indication informing the browser that the job has actually ended (if being observed that no error having been reported, this means that printing was successful).

It is to be noted that the browser does not associate a success or error notification with the window.print( ) function that would be addressed to the requesting application upon completion of the printing. However, if another printing API handling such a notification mechanism is to be used, the web browser would simply use the mechanism provided by this printing interface to notify the completion of the printing task to the requesting application.

In a variant of the previous example, the web runtime environment provides web applications with an API that makes it possible to request specific types of services. In addition, a script module adapted to abstract the usage of different printing service types is loaded based on an indication provided by the web application (e.g. a script tag referring to such a script module).

In order to request the selection of a printing service, the web application relies on an interface provided by the script module. For instance, a function may be made available by the script module to do so, e.g. module.print(data). Based on this request, the script module determines a number of printing service types it supports. The determined types may depend on the web application request, for instance depending on the data to be printed. The script module then requests the web runtime environment through a generic service discovery interface, for instance a function which takes a list of service types as parameter. The web runtime environment discovers the corresponding services and shows a list to the user for selection. A driver is loaded and a communication channel is created by the web runtime environment between the script module and the driver application. This communication channel is for instance established by returning a dedicated object to the script module, the object making it possible to send and receive messages. The same kind of object may be provided to the driver application.

The other steps are similar to what has been described previously, the exchanges between the script module and the driver being done through messages.

Figure 8:
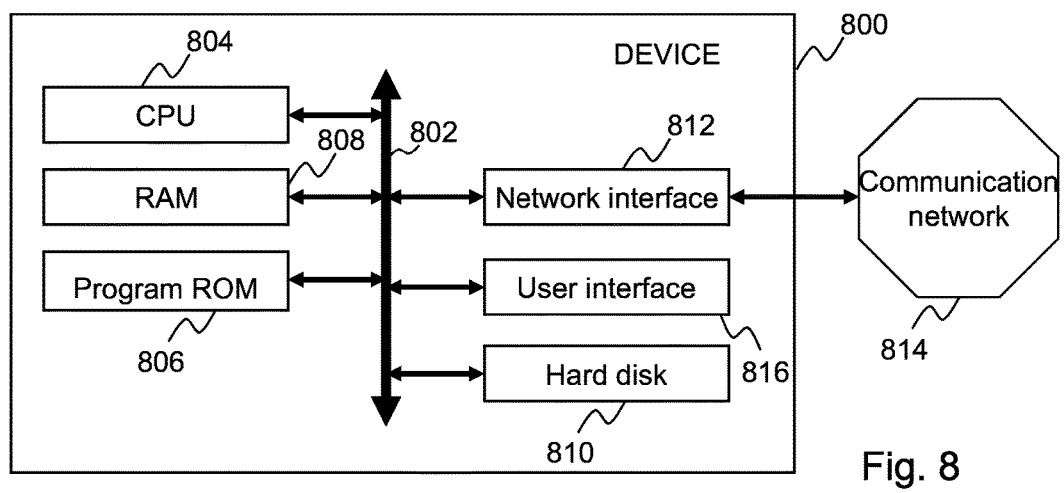
FIG. 8 represents a block diagram of a computer device in which steps of one or more embodiments may be implemented.

FIG. 8 represents a block diagram of a computer device 800 in which steps of one or more embodiments may be implemented.

Preferably, the device 800 comprises a communication bus 802, a central processing unit (CPU) 804 capable of executing instructions from program ROM 806 on powering up of the device, and instructions relating to a software application from main memory 808 after the powering up. The main memory 808 is for example of Random Access Memory (RAM) type which functions as a working area of CPU 804 via the communication bus 802, and the memory capacity thereof can be expanded by an optional RAM connected to an expansion port (not illustrated). Instructions relating to the software application may be loaded to the main memory 808 from a hard-disk (HD) 810 or the program ROM 806 for example. Such software application, when executed by the CPU 804, causes the steps described with reference to FIGS. 3 to 7 to be performed in the computer device.

Reference numeral 812 is a network interface that allows the connection of the device 800 to the communication network 814. The software application when executed by the CPU 804 is adapted to react to requests received through the network interface and to provide data and requests via the network to other devices.

Reference numeral 816 represents user interfaces to display information to, and/or receive inputs from, a user.

It should be pointed out here that, as a variant, the device 800 for processing data can consist of one or more dedicated integrated circuits (ASICs) that are capable of implementing the method as described with reference to FIGS. 3 to 7.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for processing a service request by a web runtime environment in a processing device, the processing of the service request enabling a service provider to provide a service requested in the service request, the method comprising:
    selecting a specific interface based on the service request;
    discovering the service provider and the web driver application associated with the service requested in the service request and implementing the selected specific interface;
    loading the web driver application for execution by the web runtime environment for communicating with the service provider;
    executing the web driver application associated with the service requested in the service request and implementing the selected specific interface;
    interacting with the web driver application, via said specific interface, for providing the service by the service provider,
    the selecting, executing, and interacting steps being carried out in the web runtime environment; and
    wherein the step of discovering the service provider and the web driver application comprises receiving a service description, the service description comprising information relative to the location of the web driver application.

2. The method of claim 1, wherein the service request is a network service request, the service provider being hosted in a device remote from the processing device.

3. The method of claim 1, further comprising receiving, in the web runtime environment, via a standard interface implemented within the web runtime environment, the service request from a service requester application.

4. The method of claim 3, further comprising receiving at least one item of information from the service provider through the specific interface and the web driver application, wherein the interacting step comprises transmitting the received at least one item of information to the service requester application through the standard interface.

5. The method of claim 3, further comprising:
receiving at least one item of information from the service provider through the specific interface and the web driver application; and
processing the received at least one item of information in the web runtime environment,
wherein the interacting step comprises transmitting the processed at least one item of information to the service requester application through the standard interface or transmitting a result of processing the received at least one item of information to the service requester application through the standard interface.

6. The method claim 1, further comprising transforming the service request in the web runtime environment, thereby obtaining a transformed service request, the transformed service request being adapted to be processed by the specific interface, wherein the interacting step comprises sending the transformed service request to the web driver application using the specific interface.

7. The method of claim 1, wherein the interacting step comprises transmitting data received from the service requester application or from a component of the web runtime environment to the service provider through the specific interface and the web driver application, the data being data to be processed by the service requested in the service request.

8. The method of claim 7, wherein the data received from the service requester application or from a component of the web runtime environment and transmitted to the service provider through the specific interlace and the web driver application are received after having received the service request.

9. The method of claim 7, further comprising processing the data in the web runtime environment, the step of transmitting data to the service provider through the specific interface and the web driver application comprising transmitting the processed data to the service provider through the specific interface and the web driver application.

10. The method of claim 1, further comprising determining that loading the web driver application for execution by the web runtime environment for communicating with the service provider is mandatory.

11. The method of claim 1, further comprising:
determining that loading the web driver application for execution by the web runtime environment for communicating with the service provider is optional; and
obtaining items of information for determining whether or not the web driver application for execution by the web runtime environment for communicating with the service provider is to be loaded.

12. The method of claim 1, further comprising determining whether or not the web driver application is loaded within the web runtime environment.

13. The method of claim 1, wherein the web driver application is configured for interacting with a plurality of service providers and/or a plurality of service requesters.

14. The method of claim 1, further comprising displaying an interface associated with the web driver application and receiving a user input through the web driver application, the user input being obtained via the interface associated with the web driver application, further comprising displaying a second interface, different from the interface associated with the web driver application, after receiving the user input.

15. The method of claim 1, wherein said specific interface is a specific application interface.

16. The method of claim 15, wherein said specific application interface is an Application Programming Interface.

17. The method of claim 15, wherein the implementation of said specific interface provides a set of functions associated with a type of service.

18. The method of claim 1, wherein said specific interface is a communication interface configured for the exchange of a set of messages associated with a type of service.

19. The method of claim 18, further comprising a step of loading a script module upon instruction of a service requester application generating the service request, and wherein the interacting with the web driver application is performed by the script module through the communication interface.

20. A device for processing a service request by a web runtime environment implemented in the device, the processing of the service request enabling a service provider to provide a service requested in the service request, the device comprising at least one microprocessor configured for carrying out in the web runtime environment the steps of:
selecting a specific interface based on the service request;
discovering the service provider and the web driver application associated with the service requested in the service request and implementing the selected specific interface;
loading the web driver application for execution by the web runtime environment for communicating with the service provider;
executing the web driver application associated with the service requested in the service request and implementing the selected specific interface;
interacting with the web driver application, via said specific interface, for providing the service by the service provider; and
wherein the step of discovering the service provider and the web driver application comprises receiving a service description, the service description comprising information relative to the location of the web driver application.

* * * * *